United States Patent
Kim et al.

(10) Patent No.: US 9,525,184 B2
(45) Date of Patent: Dec. 20, 2016

(54) MANIFOLD BLOCK FOR FUEL CELL STACK

(71) Applicant: Hyundai Motor Company, Seoul (KR)

(72) Inventors: Duck Whan Kim, Seoul (KR); Young Bum Kum, Seoul (KR); Sae Hoon Kim, Gyeonggi-do (KR); Jung Han Yu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 775 days.

(21) Appl. No.: 13/675,192

(22) Filed: Nov. 13, 2012

(65) Prior Publication Data
US 2013/0295481 A1   Nov. 7, 2013

(30) Foreign Application Priority Data
May 7, 2012   (KR) .................. 10-2012-0048302

(51) Int. Cl.
 *H01M 8/04* (2016.01)
 *H01M 8/24* (2016.01)
 *H01M 8/10* (2016.01)

(52) U.S. Cl.
 CPC ..... *H01M 8/04007* (2013.01); *H01M 8/04067* (2013.01); *H01M 8/2485* (2013.01); *H01M 2008/1095* (2013.01); *H01M 2250/20* (2013.01); *Y02E 60/50* (2013.01); *Y02T 90/32* (2013.01)

(58) Field of Classification Search
 CPC .............. H01M 8/0271; H01M 8/0284; H01M 8/04007; H01M 8/04014; H01M 8/04029; H01M 8/04067; H01M 8/04074; H01M 8/04201; H01M 8/04328; H01M 8/04335; H01M 8/04358; H01M 8/2485; H01M 2008/1095; H01M 2250/20; Y02E 60/50; Y02T 90/32
See application file for complete search history.

(56) References Cited

U.S. PATENT DOCUMENTS

| | | | | |
|---|---|---|---|---|
| 3,964,930 A | * | 6/1976 | Reiser | 429/435 |
| 4,110,392 A | * | 8/1978 | Yamazaki | 264/127 |
| 6,372,372 B1 | * | 4/2002 | D'Aleo et al. | 429/434 |
| 6,541,148 B1 | * | 4/2003 | Walsh et al. | 429/434 |
| 2008/0230288 A1 | * | 9/2008 | Shiomi et al. | 180/65.3 |

FOREIGN PATENT DOCUMENTS

| | | |
|---|---|---|
| CN | 101764240 A | 6/2010 |
| JP | 1977-013637 S | 2/1977 |
| JP | 2001-167789 A | 6/2001 |
| JP | 2002-190312 A | 7/2002 |

(Continued)

*Primary Examiner* — Ula C Ruddock
*Assistant Examiner* — Lisa S Park
(74) *Attorney, Agent, or Firm* — Mintz Levin Cohn Ferris Glovsky and Popeo, P.C.; Peter F. Corless

(57) ABSTRACT

Disclosed is a manifold block for a fuel cell, which provides excellent electrical insulation for a coolant flow channel in an internal flow channel. More specifically, a manifold block for a fuel cell stack, includes a coolant interface formed of a polymer insulating material and coolant flow channels; and a reactant gas interface formed of a metal material and including reactant gas flow channels. In particular, the reactant and coolant interfaces are mounted to a stack module and, at the same time, are integrally bonded to each other.

10 Claims, 7 Drawing Sheets

(56) References Cited

FOREIGN PATENT DOCUMENTS

| | | | |
|---|---|---|---|
| JP | 2002260692 | A | 9/2002 |
| JP | 2002343409 | A | 11/2002 |
| JP | 2003317793 | A | 11/2003 |
| JP | 2006-049129 | A | 2/2006 |
| JP | 2006179364 | A | 7/2006 |
| JP | 2007-287509 | A | 11/2007 |
| JP | 2008177100 | A | 7/2008 |
| JP | 2009252504 | A | 10/2009 |
| JP | 2010055877 | A | 3/2010 |
| JP | 2010055892 | A | 3/2010 |
| JP | 2010-262908 | A | 11/2010 |
| JP | 2012-150961 | A | 8/2012 |
| JP | 2013-020933 | A | 1/2013 |
| KR | 100953273 | B1 | 4/2010 |
| WO | 2005008114 | A3 | 1/2006 |

* cited by examiner

MANIFOLD BLOCK FOR FUEL CELL STACK

CROSS-REFERENCE TO RELATED APPLICATION

This application claims under 35 U.S.C. §119(a) the benefit of Korean Patent Application No. 10-2012-0048302 filed May 7, 2012, the entire contents of which are incorporated herein by reference.

BACKGROUND (a) Technical Field

The present invention relates to a manifold block for a fuel cell stack. More particularly, the present invention relates to a manifold block for a fuel cell, which improves the electrical insulation of a coolant flow channel in an internal flow channel.

(b) Background Art

A fuel cell is a stand alone electrical generation system that does not convert the chemical energy from fuel into heat via combustion, but instead electrochemically converts the chemical energy directly into electrical energy in a fuel cell stack or module. At present, one of the most attractive fuel cells for a vehicle is a polymer electrolyte membrane fuel cell (PEMFC), which has the highest power density among the fuel cell options on the market.

The fuel cell stack included in the PEMFC includes a membrane electrode assembly (MEA), a gas diffusion layer (GDL), a gasket, a sealing member, and a separator. The MEA includes a polymer electrolyte membrane through which hydrogen ions are transported. An electrode/catalyst layer, in which an electrochemical reaction takes place, is disposed on each of both sides of the polymer electrolyte membrane. The GDL uniformly diffuses reactant gases and transmit generated electricity. The gasket provides an appropriate airtight seal for the reactant gases and coolant. The sealing member provides an appropriate bonding pressure, and the separator supports the MEA and GDL, collects and transmits generated electricity, transmits reactant gases, transmits and removes reaction products, and transmits coolant to remove reaction heat, etc.

A fuel cell stack also includes a manifold block for forming an inlet flow channel and an outlet flow channel of the fuel cell stack. The manifold block acts as an interface member which allows gas and coolant before and after the reaction to flow in and out of the fuel cell stack respectively.

The manifold block has a long and complex internal flow channel through which gas and coolant passes. When a plurality of stack modules are mounted to a fuel cell vehicle, the manifold block attached to the outside of the stack module serves to uniformly supply reactant gases (air and hydrogen) and coolant to each stack module. For example, the manifold block is typically manufactured via aluminum die-casting and then forms an insulating coating on a coolant flow channel.

FIG. 1 is a cross-sectional view illustrating a conventional manifold block with a coolant flow channel that is connected to a stack module, taken along the coolant flow channel 11. As shown in FIG. 1, an end plate 31 is assembled to the outermost end of a fuel cell stack 30, and a manifold block 10 is attached to the outside of the end plate 31 with a gasket 32 interposed therebetween.

An interface unit 14, through which coolant is introduced, is connected to one side of the manifold block 10 such that the coolant introduced through the interface unit 14 passes through the coolant flow field 11 in the manifold block 10 and is supplied to the stack module 30 and the coolant discharged from the stack module 30 is discharged to the outside through the interface unit 14. The interface unit 14 may be, for example, made of plastic. In FIG. 1, a coolant flow channel for discharging the coolant exiting from the stack module 30 to the outside, and a corresponding interface unit for discharging the coolant are not shown.

In the manifold block 10 shown in FIG. 1, the coolant flow channel 11 is in the form of a straight line bent at a predetermined angle, and the coolant is filled therein at all times. When coolant is filled in the coolant flow field 11 of the manifold block 10, high-voltage electricity generated in the stack module 30 may travel to the outside (e.g., a chassis of the vehicle) through the coolant in the aluminum manifold block. This uncontained electricity may cause an electrical shock to a driver or individual working on the vehicle. Accordingly, an insulating coating (e.g., ceramic coating, epoxy coating, Teflon coating, etc.) is often applied to the entire coolant flow channel 11 of the manifold block 10.

The manifold block 10 shown in FIG. 1 provides a simple design and a sufficient size, for the coolant flow channel, thus reducing the differential pressure therein. However, the quality of coating quality changes significantly based on the operational environment during the insulating coating process, and the surface roughness becomes worsens due to agglomeration of the coating, which is very problematic. Moreover, the insulation performance is satisfactory initially but degrades over time, and after the insulating coating is destroyed, electrical corrosion begins to occur, which is also problematic.

In an effort to solve these problems, as shown in FIG. 2, a manifold block 10 in which a separate insulating member is mounted to a coolant flow channel has been disclosed. As shown in FIG. 2, an insulating member 21 having the same shape as a coolant flow field 11 is put on a conventional manifold block 10, and a bisected plastic insulating cover 23 for fixing and protecting the insulating member 212 is inserted into both sides of the flow field, thus ensuring insulation of the coolant flow field and, at the same time, eliminating the insulating coating process which is additionally performed in the existing manifold block.

However, the conventional manifold block 10 has the following problems. Additional parts such as the insulating member 21, the insulating cover 23, etc. are used, which increases the development and manufacturing costs. Moreover, the insulating cover 23 in the flow field may be damaged, which blocks the coolant channel, and the joint of the bisected insulating cover may adversely affect the coolant flow.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a manifold block for a fuel cell stack, which is configured in such a manner that a coolant interface is formed of a polymer insulating material by an injection molding process to ensure electrical insulation of a coolant flow channel, a reactant gas interface is formed by a casting process, which facilitates the formation of a complex flow channel, and the interfaces are mounted to a stack module and, at the same time, integrally bonded to each other.

In one aspect, the present invention provides a manifold block for a fuel cell stack, the manifold block including: a coolant interface formed of a polymer insulating material having excellent insulating performance and including coolant flow channels; and a reactant gas interface formed of a metal material having excellent moldability and including reactant gas flow channels. More specifically, interfaces are mounted to a stack module and, at the same time, integrally bonded to each other.

In an exemplary embodiment, the coolant interface may include a coolant inlet for supplying coolant to the stack module and a coolant outlet for discharging the coolant from the stack module. The coolant inlet and the coolant outlet may include plate-shaped flanges, each bonded to an opposite side of the stack module at an end of each of the flow channels.

In some exemplary embodiments, the flanges of the coolant interface may include gasket mounting grooves for mounting a module gasket between the coolant interface and the stack module. The flanges of the coolant interface may also include flow channel apertures connected to the reactant gas channels of the reactant gas interface to serve as channels.

The reactant gas interface may include plate-shaped flanges which are bonded to the flanges of the coolant interface at the ends of the reactant gas channels. The flanges of the reactant gas interfaces may include gasket mounting grooves for mounting an interface gasket between the flanges of the reactant gas interfaces and the flanges of the coolant interface.

In a further exemplary embodiment, the flanges of the reactant gas interfaces may include openings through which flow channel shape units of the coolant interface can pass.

In another further exemplary embodiment, the flanges of the coolant interface and the flanges of the reactant gas interface may include a plurality of bolting apertures to be able to mount the coolant interface and the reactant gas interface, which are bonded to each other, to the stack module.

In still another further preferred embodiment, the coolant interface may be integrally formed with the reactant gas interface by an insert injection molding process, in which the reactant gas interface is used as an insert.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
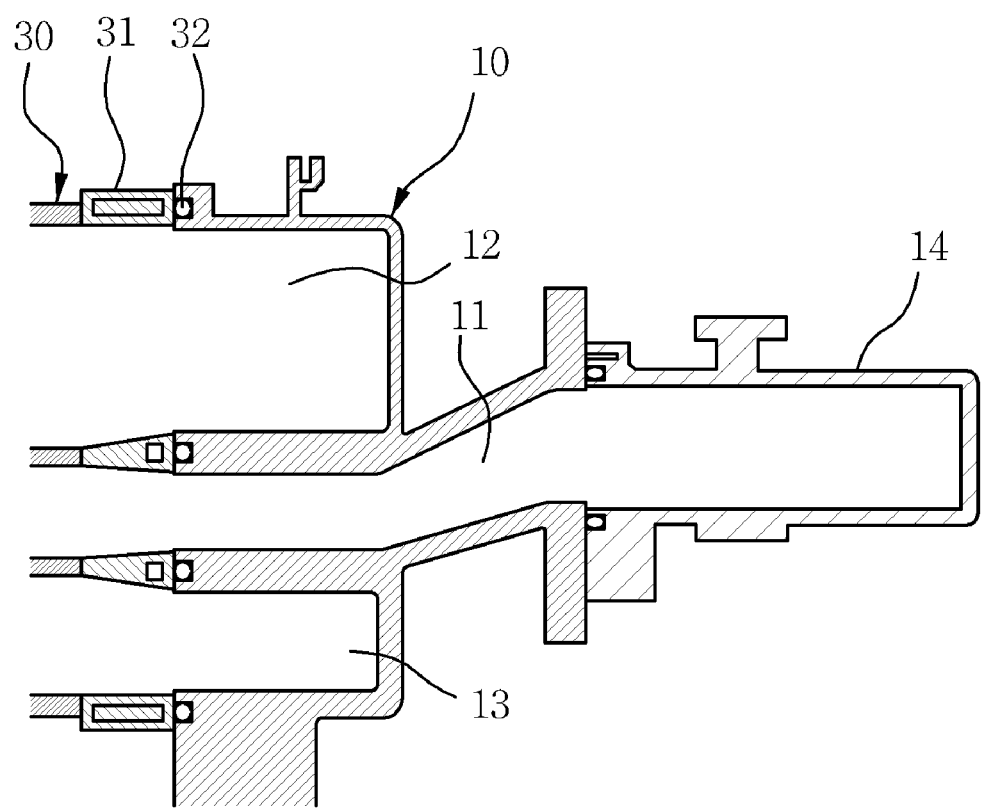
FIG. 1 is a cross-sectional view showing that a conventional manifold block is connected to a stack module, taken along a coolant flow channel.
Figure 2:
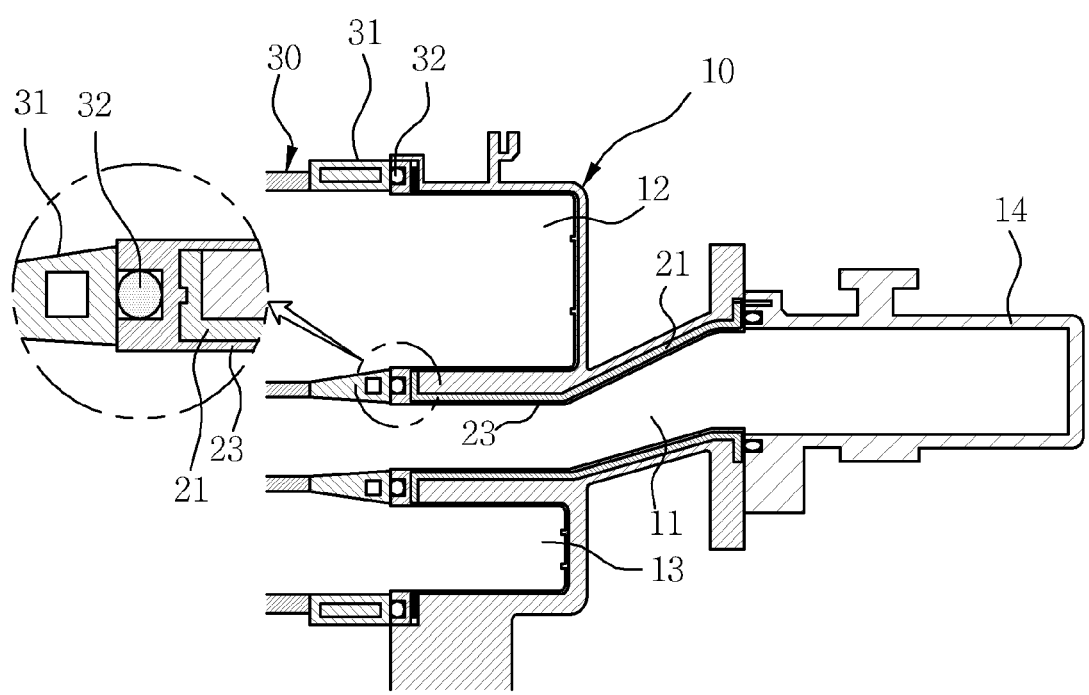
FIG. 2 is a cross-sectional view showing that an improved conventional manifold block is connected to a stack module, taken along a coolant flow channel.

Reference numerals set forth in the Drawings includes reference to the following elements as further discussed below:

100: manifold block
110: coolant interface
111: coolant inlet
112: coolant outlet
113 & 114: flanges
115 & 116: gasket mounting grooves
117 & 118: flow channel apertures
119: module gasket
120 & 121: flow channel shape units
122 & 123: coolant flow channels
124: bolting hole
130: reactant gas interface
131 & 132: flanges
133 & 134: gasket mounting grooves
135 & 136: openings
137 & 138: reactant gas flow channels
139: interface gasket
140: bolting hole
200: stack module It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

A manifold block of the present invention is attached to the outside of a fuel cell stack to supply reactant gases (air and hydrogen) and coolant to the fuel cell stack and discharge them from the fuel cell stack. The manifold block includes a coolant flow channel for the flow of coolant and a reactant gas flow channel for the flow of reactant gases therein so that introduced coolant and reactant gases are supplied to and discharged from a stack module through the flow channels.

When the coolant channel in such a manifold block is not insulated, high-voltage electricity generated in the stack module may travel to the outside through the coolant. That is, if the coolant flow channel is made of metal (e.g., aluminum), the traveling electricity may translate to a chassis of a vehicle, thus causing an electrical shock to a driver or worker. Accordingly, the coolant flow channel of the manifold block requires electrical insulation, and thus the coolant flow channel is made of an insulating material in the present invention.

However, the reactant flow channel of the manifold block is configured to uniformly supply the reactant gases to each stack module by reducing the differential pressure in the flow channel and thus has a very complex configuration for this purpose. As a result, it is nearly impossible to manufacture the entire manifold block as an injection molded product embodied as a single structure (i.e., 1 piece).

Thus, the present invention provides a manifold block for a fuel cell stack, which is configured so that a coolant interface is formed of a polymer insulating material via an injection molding process to ensure electrical insulation of the coolant flow field, a reactant gas interface is formed via a casting process, which facilitates the formation of a complex flow field, and the interfaces are mounted to the stack module and, at the same time, integrally bonded to each other.

The coolant and reactant gas interfaces, which are formed via different forming processes according to the present invention, are mounted to the stack module and, at the same time, integrally bonded to each other, which minimizes the space that the interfaces occupy, thus allows for manufacture of a compact fuel cell stack.

According to the manifold block of the present invention, it is possible to achieve and maintain the insulation performance of the coolant flow channel, ensure the strength for supporting the stack module, and freely provide the complex reactant gas flow channel by a simpler method than is done by conventionally applying an insulating coating or separate insulating member to the coolant flow channel.

When the interface with the coolant flow channel and the interface with the reactant gas flow channel are separately configured, the interfaces can be mounted to the stack module, which requires a relatively large space for mounting the respective interfaces. As a result, the size of the fuel cell stack increases, which makes it difficult to mount in the vehicle.

As mentioned above, the manifold block 100 for the fuel cell stack according to the present invention includes the coolant interface 110, which is formed of a polymer insulating material having excellent insulating performance and has coolant flow channels 122 and 123 by an injection molding process, and the reactant gas interface 130, which is formed by a casting process and has reactant gas flow channels 137 and 138, the interfaces 110 and 130 being mounted to the stack module 200 and, at the same time, integrally bonded to each other.

Figure 3:
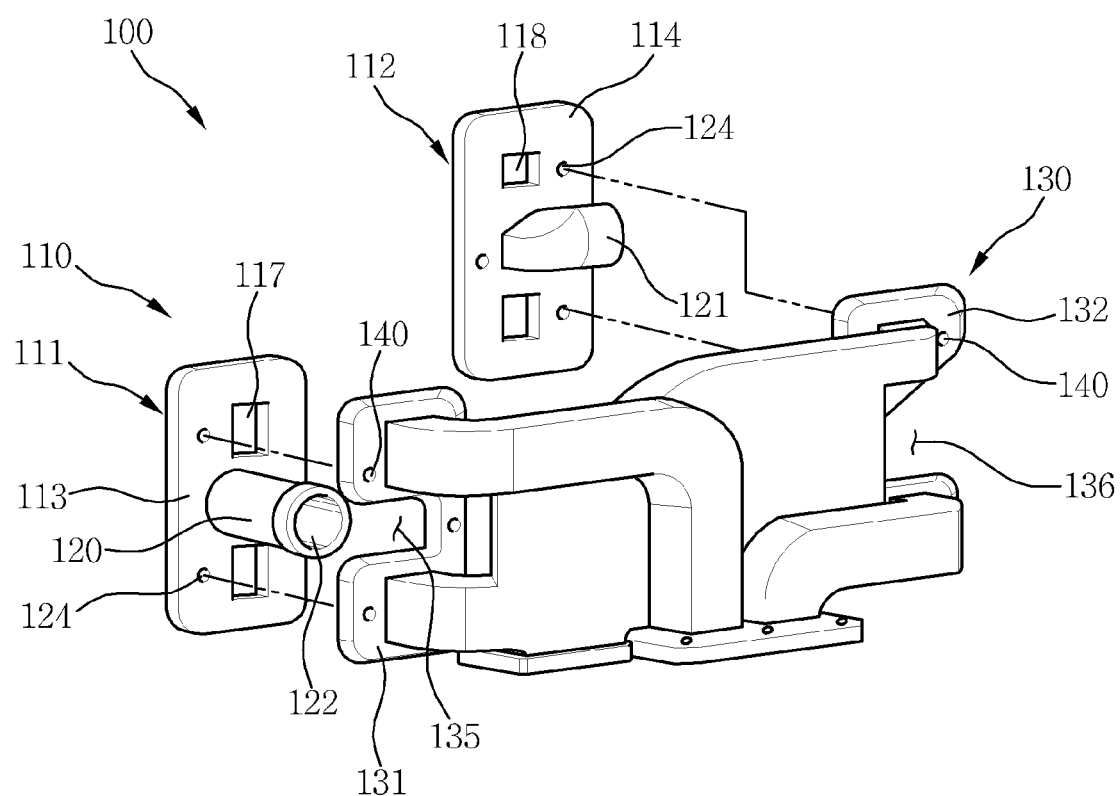
FIG. 3 is an exploded perspective view showing a manifold block in accordance with an exemplary embodiment of the present invention.
Figure 4:
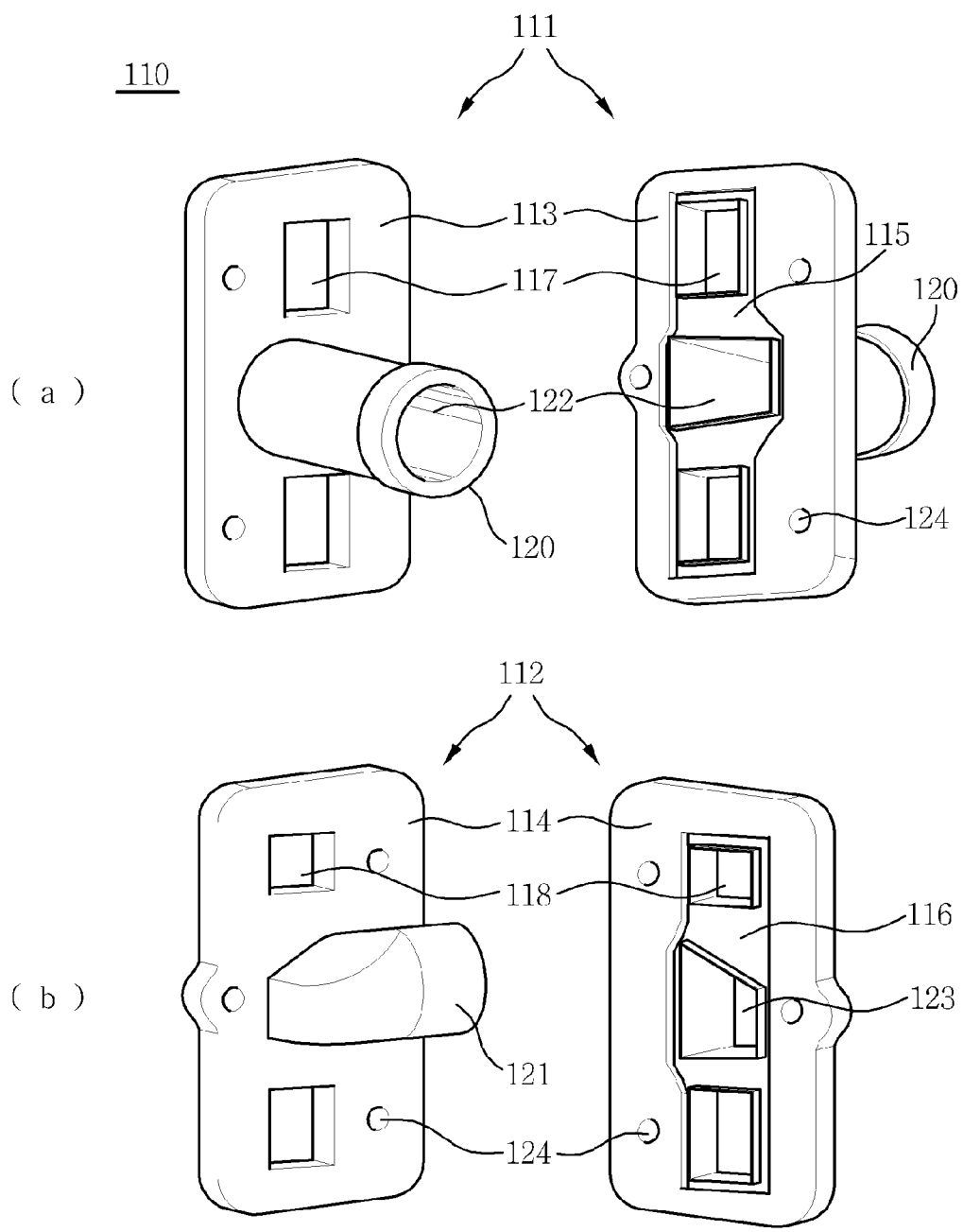
FIG. 4 is a view showing a coolant interface in the manifold block in accordance with the exemplary embodiment of the present invention.

As shown in FIGS. 3 and 4, the coolant interface 110 includes a coolant inlet 111 for supplying coolant to the stack module 200 and a coolant outlet 112 for discharging the coolant from the stack module 200 to the outside. The coolant inlet 111 and the coolant outlet 112 have flanges 113 and 114, respectively, each matched with an opposite side of the stack module 200 (i.e., an opposite side of an end plate) at an end of each of the flow channels 122 and 123 so as to be bonded to the reactant gas interface 130 during mounting to the stack module 200.

Each of the flanges 113 and 114 has a plate shape which surrounds the entire edge of each of the coolant flow channels 122 and 123 on one side of each of the coolant inlet 111 and the coolant outlet 112. When the coolant interface 110 is mounted to the stack module 200, each of the flanges 113 and 114 is bonded to the opposite side of the stack module 200 and bonded to each of flanges 131 and 132 of the reactant gas interface 130 so that the manifold block 100 is integrally configured. Moreover, the flanges 113 and 114 include gasket mounting grooves 115 and 116 for mounting a module gasket 119 between the coolant interface 110 and the stack module 200 when the coolant interface 110 is mounted to the stack module 200.

Accordingly, when the coolant interface 110 is mounted to the stack module 200, the module gasket 119 for sealing is interposed between the flanges 113 and 114 of the coolant interface 110 and the opposite sides of the stack module 200 through the gasket mounting grooves 115 and 116, thus maintaining an air tight seal.

Furthermore, flow channel apertures 117 and 118 which are connected to the reactant gas flow channels 137 and 138 when the flanges 113 and 114 are bonded to the flanges 131 and 132 of the reactant gas interface 130 are formed on both sides of the coolant flow channels 122 and 123. The flow channel apertures 117 and 118 are connected to the reactant gas flow channels 137 and 138 to serve as the flow channels of the reactant gases supplied to and discharged from the stack module 200. Moreover, the coolant inlet 111 and the coolant outlet 112 have flow channel shape units 120 and 121 for forming the coolant flow channels 122 and 123, respectively.

As shown in FIG. 4, the flow channel shape units 120 and 121 are integrally formed in the center of each of the flanges 113 and 114, i.e., between the flow channel apertures 117 and 118 which are disposed on both sides thereof. In the case of the coolant inlet 111, the flow channel shape unit 120 is provided with a straight pipe shape perpendicular to the flange 113. As for the coolant outlet 112, the flow channel shape unit 121 is provided with a bent pipe shape having a substantially "ㄱ" shape, whose one end is perpendicular to the flange 114.

That is, the coolant inlet 111 and the coolant outlet 112, which constitute the coolant interface 110 includes the pipe-type flow channel shape units 120 and 121, which form the coolant flow channels 122 and 123, and the plate-shaped flanges 113 and 114 which surround the entire edge of the coolant flow channels 122 and 123 at the ends of the flow channel shape units 120 and 121.

The reactant gas interface 130 includes the reactant gas flow channels 137 and 138 having a relatively complex configuration and includes the flanges 131 and 132 matched with the flanges of the coolant interface 110.

Figure 5:
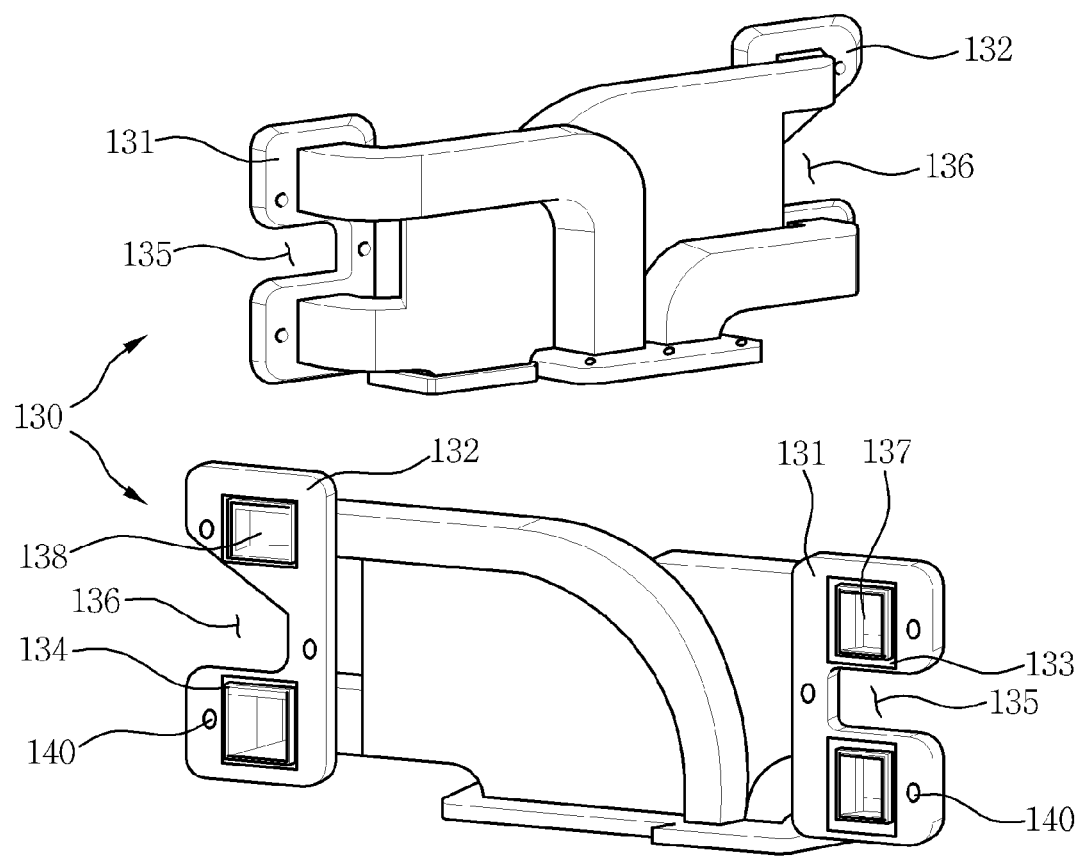
FIG. 5 is a view showing a reactant gas interface in the manifold block in accordance with the exemplary embodiment of the present invention.
Figure 6:
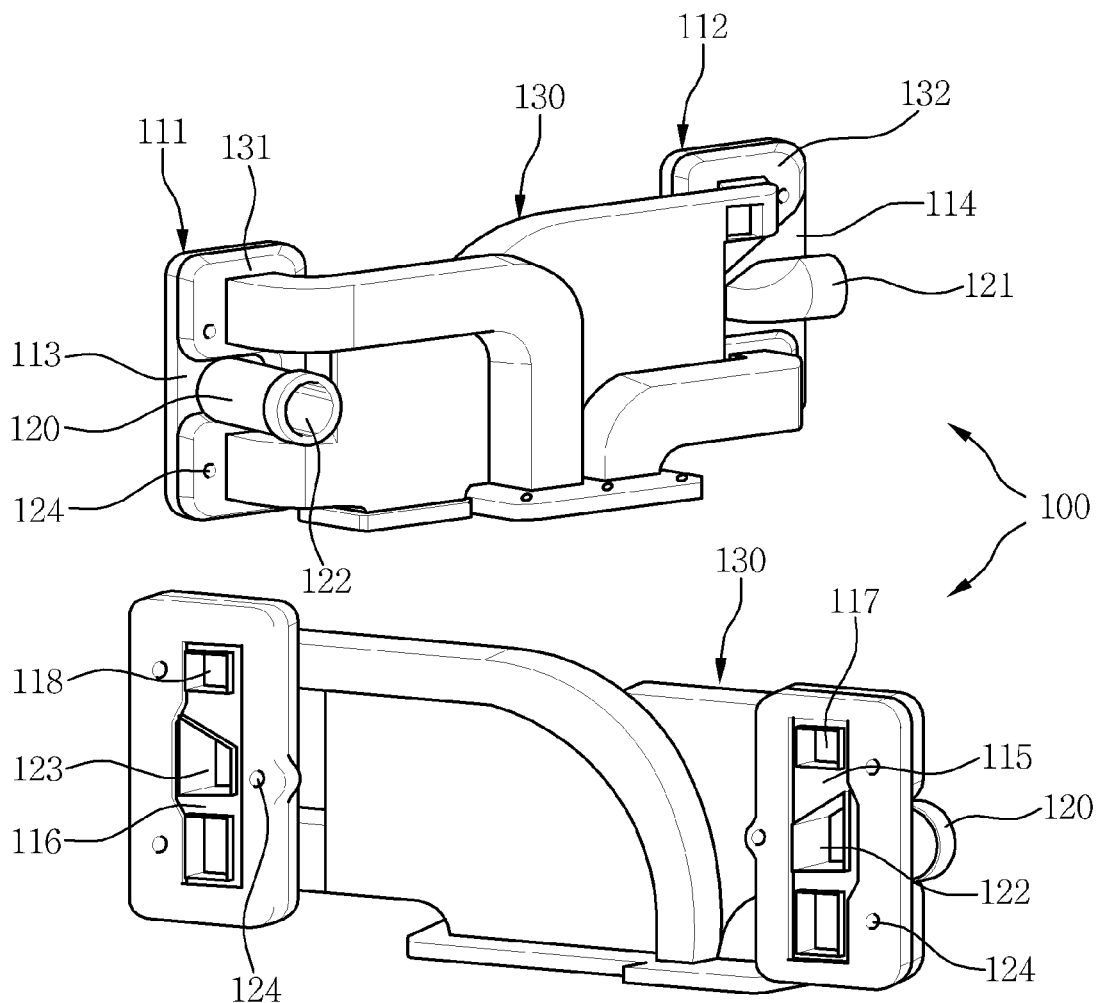
FIG. 6 is an assembled perspective view showing the manifold block in accordance with the exemplary embodiment of the present invention.
Figure 7:
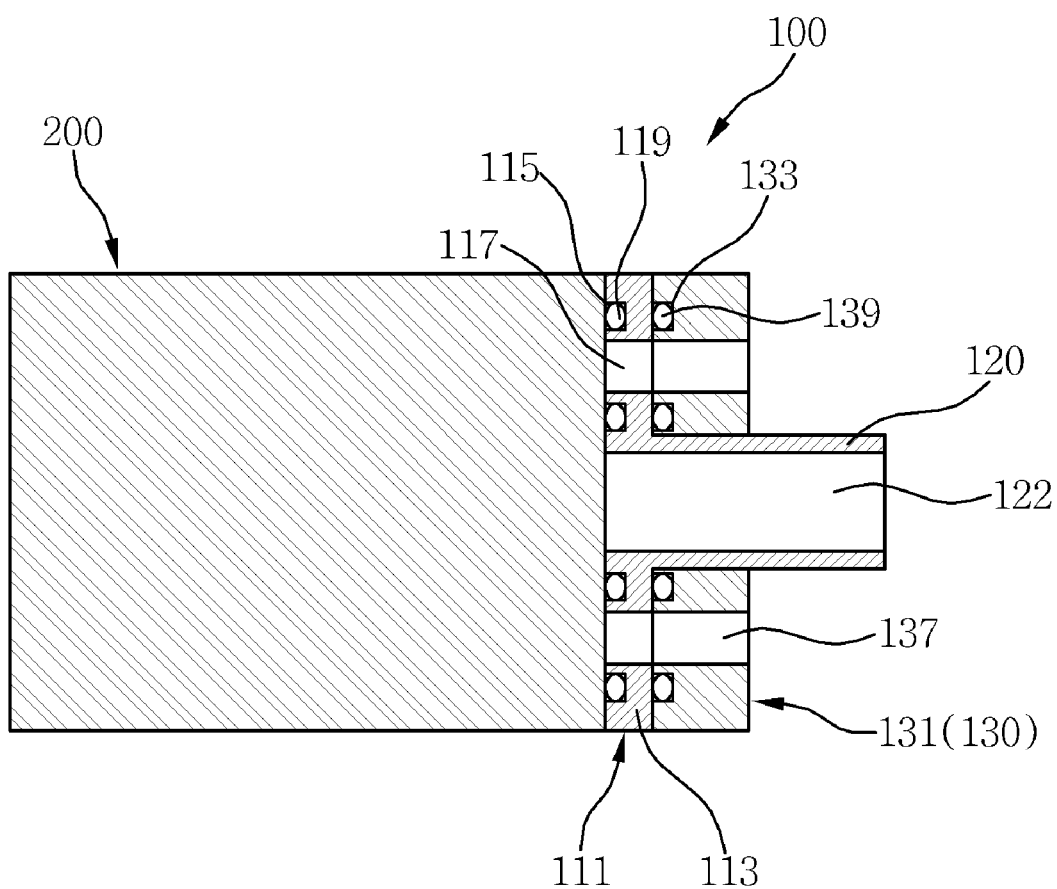
FIG. 7 is a cross-sectional view showing that the manifold block in accordance with the exemplary embodiment of the present invention is connected to a stack module.

As shown in FIG. 5, each of the flanges 131 and 132 have a plate shape which surrounds the entire edge of each of the reactant gas flow channels 137 and 138. When the reactant gas interface 130 is mounted to the stack module 200, the flanges 131 and 132 are bonded to the flanges 113 and 114 of the coolant interface 110 interposed between the coolant interface 110 and the stack module 200 so that the manifold block 100 is integrally configured. Moreover, the flanges 131 and 132 include gasket mounting grooves 133 and 134 for mounting an interface gasket 139 between the reactant gas interface 130 and the flanges 113 and 114 of the coolant interface 110 when the reactant gas interface 130 is mounted to the stack module 200.

Accordingly, when the reactant gas interface 130 is mounted to the stack module 200, the interface gasket 139 for sealing is interposed between the reactant gas interface 130 and the flanges 113 and 114 of the coolant interface 110 through the gasket mounting grooves 133 and 134, thus maintaining an air tight seal.

Furthermore, the flanges 131 and 132 of the reactant gas interface 130 include openings 135 and 136 through which the flow channel shape units 120 and 121 of the coolant interface 110 can pass. The openings 135 and 136 are formed between the reactant gas flow channels 137 and 138 spaced apart on both sides of each of the flanges 131 and 132 to eliminate any interference of the flow channel shape units 120 and 121 when the flanges 113, 114, 131, and 132 of the reactant gas and coolant interfaces 110 and 130 are bonded to each other. In addition, the flanges 113, 114, 131, and 132 of the reactant gas and coolant interfaces 110 and 130 have bolting apertures 124 and 140 such that the bonded flanges 113, 114, 131, and 132 are mounted to the stack module 200.

That is, the flanges 113, 114, 131, and 132 of the reactant gas and coolant interfaces 110 and 130 have a plurality of bolting apertures 124 and 140 for the bonding to the stack module 200, and the coolant and reactant gas interfaces 110 and 130 pass through the bolting apertures 124 and 140 and are then fixed to the opposite sides of the stack module 200 via fastening bolts (not shown) assembled to the stack module 200. Here, due to the fastening force of the fastening bolts, the flanges 113 and 114 of the coolant interface 110 are bonded to the opposite sides of the stack module 200, the flanges 131 and 132 of the reactant gas interface 130 are bonded to the flanges of the coolant interface 110 and, at the same time, the gaskets 119 and 139 between the stack module 200 and the flange 113 and 114 of the coolant interface 110 and between the flanges 113, 114, 131, and 132 of the reactant gas and coolant interfaces 110 and 130 are pressed, thus maintaining an air tight seal through a simple design.

That is, the coolant and reactant gas interfaces 110 and 130 can be mounted to the stack module 200 without any fastening process and integrally bonded to each other, and thus the manifold block 100 is integrated.

According to the above-described manifold block of the present invention, it is possible to achieve and maintain the insulating properties of the coolant flow channels, ensure the strength for supporting the stack module, facilitate the formation of the reactant gas flow channels of complex layout, and reduce the differential pressure in the flow channel, thus improving the performance of the fuel cell stack.

Moreover, according to the above-described manifold block of the present invention, it is possible to provide a simple and compact structure for ensuring the insulation of the coolant flow channel, thus increasing the power density of the fuel cell stack, compared to the conventional method of applying an insulating coating or separate insulating member to the coolant flow channel.

Furthermore, the coolant interface 100 and the reactant gas interface 130 may be integrally formed via an insert injection molding process before being mounted to the stack module 200. To this end, the reactant gas interface 130 is formed of a metal material (e.g., aluminum) via a casting process. Then, the coolant interface 110 is formed by an insert injection molding process in which the formed reactant gas interface 130 is inserted into an insert mold, so that the coolant interface 110 is integrally formed with the reactant gas interface 130.

As described above, according to the manifold block for the fuel cell stack of the present invention, it is possible to ensure excellent insulating performance of the coolant flow channel, prevent electrical corrosion, and provide a simple and compact structure without any separate insulating coating or insulating member, thus increasing the power density of the fuel cell stack.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A manifold block for a fuel cell stack, the manifold block comprising:
   a coolant interface formed of a polymer insulating material and including a plurality of coolant flow channels; and
   a reactant gas interface formed of a moldable metal material and including a plurality of reactant gas flow channels,
   wherein the coolant interface and the reactant gas interface are mounted to a stack module of the fuel cell and, at the same time, integrally bonded to each other,
   wherein the coolant interface comprises a coolant inlet configured to supply coolant to the stack module and a coolant outlet configured to discharge the coolant from the stack module, the coolant inlet and the coolant outlet including flanges, each bonded to an opposite side of the stack module at an end of each of the plurality of coolant flow channels,
   wherein the flanges of the coolant interface comprise a plurality of flow channel apertures connected to the plurality of reactant gas flow channels of the reactant gas interface to serve as part of the plurality of reactant gas flow channels,
   wherein the reactant gas interface comprises flanges which are bonded to the flanges of the coolant interface at the ends of the plurality reactant gas flow channels, and
   wherein the flanges of the reactant gas interface comprise openings through which flow channel shape units of the coolant interface pass.

2. The manifold block of claim 1, wherein the flanges of the coolant interface comprise a plurality of gasket grooves configured to mount a module gasket between the coolant interface and the stack module.

3. The manifold block of claim 1, wherein the flanges of the reactant gas interfaces comprise gasket grooves configured to mount an interface gasket between the flanges of the reactant gas interfaces and the flanges of the coolant interface.

4. The manifold block of claim 1, wherein the flanges of the coolant interface and the flanges of the reactant gas interface comprise a plurality of bolting apertures that are used to mount the coolant interface and the reactant gas interface, which are bonded to each other, to the stack module.

5. The manifold block of claim 1, wherein the coolant interface is integrally formed with the reactant gas interface by an insert injection molding process, in which the reactant gas interface is used as an insert.

6. A vehicle including a manifold block for a fuel cell stack, the manifold block comprising:
- a coolant interface comprising a polymer insulating material and including a plurality of coolant flow channels; and
- a reactant gas interface formed of a moldable metal material and including a plurality of reactant gas flow channels,
- wherein the coolant interface and the reactant gas interface are integrally bonded to each other and mounted to the stack module,
- wherein the coolant interface comprises a coolant inlet configured to supply coolant to the stack module and a coolant outlet configured to discharge the coolant from the stack module, the coolant inlet and the coolant outlet including flanges, each bonded to an opposite side of the stack module at an end of each of the plurality of coolant flow channels,
- wherein the flanges of the coolant interface comprise a plurality of flow channel apertures connected to the plurality of reactant gas flow channels of the reactant gas interface to serve as part of the plurality of reactant gas flow channels,
- wherein the reactant gas interface comprises flanges which are bonded to the flanges of the coolant interface at the ends of the plurality reactant gas flow channels and
- wherein the flanges of the reactant gas interface comprise openings through which flow channel shape units of the coolant interface pass.

7. The vehicle of claim 6, wherein the flanges of the coolant interface comprise a plurality of gasket grooves configured to mount a module gasket between the coolant interface and the stack module.

8. The vehicle of claim 6, wherein the flanges of the reactant gas interfaces comprise gasket grooves configured to mount an interface gasket between the flanges of the reactant gas interfaces and the flanges of the coolant interface.

9. The vehicle of claim 6, wherein the flanges of the coolant interface and the flanges of the reactant gas interface comprise a plurality of bolting apertures that are used to mount the coolant interface and the reactant gas interface, which are bonded to each other, to the stack module.

10. The vehicle of claim 6, wherein the coolant interface is integrally formed with the reactant gas interface by an insert injection molding process, in which the reactant gas interface is used as an insert.

* * * * *